(12) United States Patent
Pudipeddi et al.

(10) Patent No.: US 7,447,877 B2
(45) Date of Patent: Nov. 4, 2008

(54) METHOD AND APPARATUS FOR CONVERTING MEMORY INSTRUCTIONS TO PREFETCH OPERATIONS DURING A THREAD SWITCH WINDOW

(75) Inventors: Bharadwaj Pudipeddi, Santa Clara, CA (US); Udo Walterscheidt, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 1124 days.

(21) Appl. No.: 10/172,180

(22) Filed: Jun. 13, 2002

(65) Prior Publication Data

US 2003/0233521 A1 Dec. 18, 2003

(51) Int. Cl.
*G06F 9/312* (2006.01)

(52) U.S. Cl. ........................ 712/209; 712/207; 712/225; 712/226

(58) Field of Classification Search ................. 712/207, 712/43, 209, 219, 225, 226, 228, 229; 718/107
See application file for complete search history.

(56) References Cited

U.S. PATENT DOCUMENTS

| 5,377,336 | A | * | 12/1994 | Eickemeyer et al. | 712/207 |
| 5,694,568 | A | * | 12/1997 | Harrison et al. | 711/213 |
| 5,802,337 | A | * | 9/1998 | Fielden | 712/216 |
| 6,073,215 | A | * | 6/2000 | Snyder | 711/137 |
| 6,088,788 | A | * | 7/2000 | Borkenhagen et al. | 712/205 |

OTHER PUBLICATIONS

Intel® Itanium™ Architecture Software Developer's Manual, vol. 3: Instruction Set Reference Revision 2.0, Dec. 2001, 3 pages.

* cited by examiner

*Primary Examiner*—David J Huisman
(74) *Attorney, Agent, or Firm*—Trop, Pruner & Hu, P.C.

(57) ABSTRACT

A method and apparatus for converting memory instructions to prefetch operations during a thread switch window is disclosed. In one embodiment, memory access instructions that are already inside an instruction pipeline when the current thread is switched out may be decoded and then converted to the complementary prefetch operations. The prefetch operation may place the data into the cache during the execution of the alternate thread.

38 Claims, 6 Drawing Sheets

| | | | |
|---|---|---|---|
| 510 | T0 | OP | LAST EXECUTED OP |
| 512 | T0 - T1 | (LD W) | CACHE MISS - NOT EXE |
| 514 | | (MOV R1 R2) | EVENT NEEDINGDATA - NOT EXE |
| 516 | T1 | OP | |
| | | OP | |
| | | OP | |
| | | • | |
| | | • | |
| | | • | |
| 520 | | OP | |
| 522 | T1 - T0 | | THREAD SWITCH |
| 524 | T0 | LD W | STILL A CACHE MISS |
| 526 | | MOV R1 R2 | AN EVENT TRIGGERING SWITCH |
| 530 | T0 - T1 | | THREAD SWITCH |
| 532 | T1 | OP | |
| | | OP | |
| | | • | |
| | | • | |
| 540 | | OP | |
| 542 | T1 - T0 | | THREAD SWITCH |
| 544 | T0 | LD W | NOW A CACHE HIT |
| 546 | | MOV R1 R2 | DATA AVAILABLE |
| | | OP | |
| | | OP | |
| | | OP | |
| | | • | |
| | | • | |
| | | • | |
| | | OP | |

FIG. 5

| | | |
|---|---|---|
| 610 — T0 | OP | LAST EXECUTED OP |
| 612 — T0 - T1 | LD W | CACHE MISS - CONVERT TO PREFETCH |
| 614 — | MOV R1 R2 | EVENT NEEDING DATA - NOT EXE |
| 616 — T1 | OP<br>OP<br>OP<br>OP<br>•<br>•<br>•<br>620 — OP | |
| 622 — T1 - T0 | | THREAD SWITCH |
| 624 — T0<br>626 —<br>628 — | LD W<br>MOV R1 R2<br>OP<br>OP<br>OP<br>•<br>•<br>•<br>640 — OP | NOW A CACHE HIT<br>DATA AVAILABLE |

METHOD AND APPARATUS FOR CONVERTING MEMORY INSTRUCTIONS TO PREFETCH OPERATIONS DURING A THREAD SWITCH WINDOW

FIELD

The present disclosure relates generally to microprocessor systems, and more specifically to microprocessor systems capable of multi-threaded operation.

BACKGROUND

Many modern computer systems are able to execute more than one distinct software program, or "thread", at a time. For this reason they are referred to as "multi-threaded" computer systems. In one approach, called sequential multi-threaded operation, the operating system or other control mechanism permits the several threads to share resources by permitting each thread that is a candidate for execution to operate in sequence on the processor. Changing between threads may be referred to as thread switching. In some of these approaches, threads are switched when the currently executing thread reaches a point when it cannot proceed, such as waiting for a memory access or an I/O transfer to finish, or when the currently executing thread has executed a particular number of instructions. The selection of the next thread to be switched in (permitted use of execution resources) may be made on the basis of strict priority. In other approaches, a round-robin approach may be used in thread switching.

Multi-threaded processor operations make great demands on system bus utilization. For this reason unnecessary accesses to system memory over a system bus should be avoided. One type of access to system memory is a prefetch, generated in one situation when a memory access instruction is expected not to find the necessary data or instruction in cache (a "cache miss"). The prefetch loads data or instructions from system memory into cache at a time prior to the expected execution of such a memory access instruction, thereby causing the memory access instruction to find the necessary data or instruction in cache (a "cache hit"). However, excessive inaccurate prefetching due to poor instruction and data prediction may slow down system performance rather than improving performance.

BRIEF DESCRIPTION OF THE DRAWINGS

The present invention is illustrated by way of example, and not by way of limitation, in the figures of the accompanying drawings and in which like reference numerals refer to similar elements and in which:

FIG. 5 is diagram showing the history of two threads executing, according to one embodiment of the present disclosure.

FIG. 6 is a diagram showing the history of two threads executing, according to another embodiment of the present disclosure.

DETAILED DESCRIPTION

The following description describes techniques for permitting the execution of prefetches in a microprocessor system. In the following description, numerous specific details such as logic implementations, software module allocation, bus signaling techniques, and details of operation are set forth in order to provide a more thorough understanding of the present invention. It will be appreciated, however, by one skilled in the art that the invention may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation. The invention is disclosed in the form of hardware within a microprocessor system. However, the invention may be practiced in other forms of processor such as a digital signal processor, a minicomputer, or a mainframe computer.

In one embodiment, memory access instructions that are already inside an instruction pipeline when the current thread is switched out would normally not be executed. In this embodiment, such memory access instructions may be decoded and then converted to the complementary prefetch operations. In one example, a load instruction would not perform an actual load, but any potential cache miss that would be caused by the load instruction would cause an immediate prefetch operation to be loaded into the memory pipeline. The prefetch operation may place the data into the cache during the execution of the alternate thread. This may increase the odds that, when the original thread begins execution once more, the memory access instruction may receive a cache hit rather than a cache miss.

Figure 1:
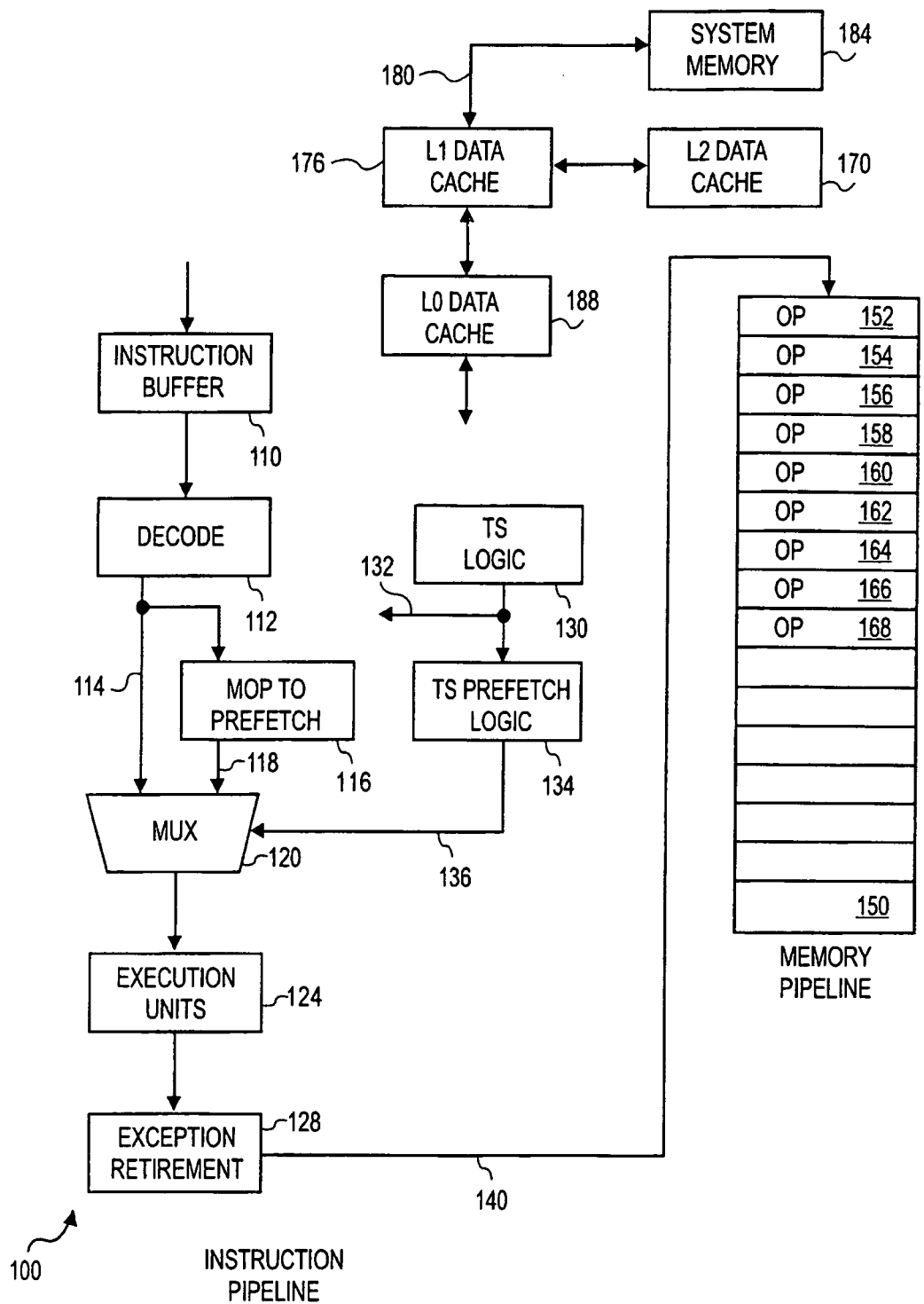
FIG. 1 is a schematic diagram of system hardware components, according to one embodiment.

Referring now to FIG. 1, a schematic diagram of system hardware components is shown, according to one embodiment. Portions of a generalized instruction pipeline 100 are shown. The generalized instruction pipeline 100 may include an instruction buffer 110 for holding instructions, a decoder 112 to convert instructions into decoded operations for execution, one or more execution units 124 for executing the decoded operations, and finally an exception/retirement block 128 to detect exceptions and update registers.

Data required by programs executing on the system of FIG. 1 may be stored in a hierarchical data cache subsystem, including, in order of increasing access latency, level zero (L0) data cache 188, level one (L1) data cache 176, level two (L2) data cache 170, and finally system memory 184. Fetch instructions attempt to access data first from L0 data cache 188, but if the requested data is not in L0 data cache (an "L0 cache miss") then circuits controlling the L0 data cache 188 attempt to access data from the other caches of increasing access latency. If the requested data is not in L2 data cache 170, the data must be accessed from system memory 184 over a system bus 180.

Access from system memory 184 has great relative data latency, and system performance suffers. Therefore there are also prefetch instructions that may be used to move data into lower latency cache from system memory 184 in anticipation of later corresponding fetch instructions to the same data. Such prefetch instructions may generate software (also called architectural) prefetch operations to occur. In addition, there also may be hardware (also called micro-architectural) prefetch operations that may be generated by certain system events or other stimuli. Either type of prefetch may be entered into the memory pipeline 150. Operations 152-168 within memory pipeline 150 may be performed in listed order and may be performed regardless of whether the event initiating the prefetch is in a currently-executing thread within instruction pipeline 100.

In order to support switching threads in a multi-threaded environment, the FIG. 1 system includes a thread switch logic 130 circuit to determine when to switch threads. A thread switch signal 132 is generated by thread switch logic 130 and may be used to control the flushing of the instruction pipeline 100. The thread switch signal 132 becomes active after a thread switch begins and may remain active during the thread switching process. The presence of the active thread switch signal 132 indicates that any instructions already in the instruction pipeline 100 should not execute to update register states or raise exceptions.

Any memory access instructions within the instruction pipeline 100 during the active period of thread switch signal will not be executed in normal fashion. They would normally have to be reloaded into the instruction pipeline 100 once the original thread is reloaded at some time in the future. If the processor shown in FIG. 1 has a reasonably good predictor, the probability is high that the instructions that were in the pipeline will in fact be executed at some future time. Therefore in one embodiment the instruction pipeline 100 also includes a memory access operation (MOP) to prefetch converter 116, a thread switch prefetch logic 134, and a multiplexor (MUX) 120. The memory access operation to prefetch converter 116 takes the already decoded memory access operations supplied by the decoder 112 and converts them to the equivalent prefetch operations. Memory access operations may include loads, stores, and memory semaphores. For example, a load (ld) operation may be converted to a line prefetch (lfetch) operation. Both the original decoded memory access operation and the prefetch operation are presented to MUX 120, via lines 114 and 118, respectively.

In normal operations, when the threads are not being switched, a prefetch window signal 136 generated by thread switch prefetch logic 134 is inactive. This causes MUX 120 to switch the decoded memory access operation from decoder 112 into the execution units 124 for execution, permitting normal operations.

However, when the current thread is in the process of being switched out, the thread switch signal 132 is active. If prefetch window signal 136 is active only during the time thread switch signal 132 is active, then MUX 120 will switch to the equivalent prefetch operation converted by the MOP to prefetch converter 116. This switching does not interfere with normal operations because any instructions within the instruction pipeline 100 during the thread switch period will not be executed normally anyway. This prefetch operation will then be received by the execution units 124 and acted upon.

In one embodiment, the prefetch operation is a hardware (micro-architectural) prefetch operation. Such a hardware prefetch operation may prefetch from memory regardless of whether the original decoded memory access operation was flushed from the instruction pipeline 100 or not. So in one embodiment the original decoded memory access operation, scheduled to be flushed from the instruction pipeline 100, is converted into a hardware prefetch operation that may be performed while an alternate thread is executing in the instruction pipeline 100. These hardware prefetch operations may be loaded ("pended") via path 140 into the pending memory access operations within memory pipeline 150.

Figure 2:
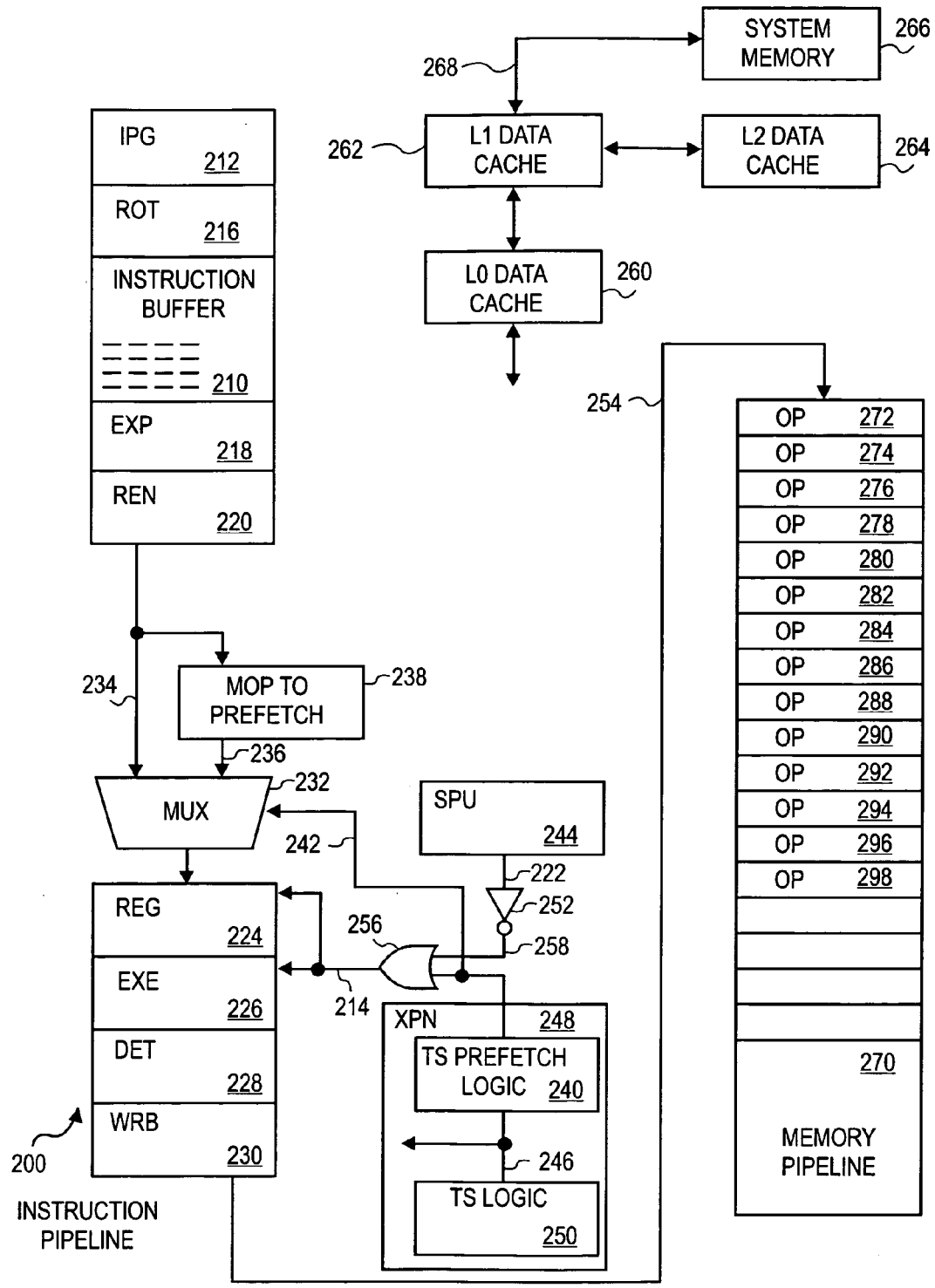
FIG. 2 is a schematic diagram of system hardware components, according to another embodiment.

Referring now to FIG. 2, a schematic diagram of system hardware components is shown, according to another embodiment. In one embodiment the hardware components of FIG. 2 may be included in an Intel® Itanium™ compatible processor. Then there is the front-end of instruction pipeline 200 including instruction prefetching (IPG) 212, and instruction rotation (ROT) 216. Several pending instructions may be stored in an instruction buffer 210. The decode logic follows, including expand (EXP) 218 and register rename (REN) 220. Subsequent to the REN 220, memory access instructions are decoded into memory access operations.

The FIG. 2 embodiment includes a MOP to prefetch converter 238, a MUX 232, a thread switch prefetch logic 240, L0 data cache 260, L1 data cache 262, L2 data cache 264, system memory 266, and system bus 268, which in one embodiment may function similarly to those of the FIG. 1 embodiment. An exception handling unit (XPN) 248 may handle exceptions detected by exception detection (DET) 228. XPN 248 also may include thread switch logic 250 to control the thread switching in instruction pipeline 200 and thread switch prefetch logic 240. In the FIG. 2 embodiment the thread switch signal may be called XPN Thread Switch 246 and the prefetch switch signal may be called XPN Prefetch Window 242. Timing for these two signals may be found in the discussion of FIG. 4 below. XPN Prefetch Window 242 may be used to direct the MUX 232 to select the decoded memory access operation received via line 234 (when XPN Prefetch Window 242 is inactive) and alternately to select the prefetch operation via line 236 (when XPN Prefetch Window 242 is active).

In addition XPN Prefetch Window 242 may be sent to subsequent instruction pipeline 200 stages such as register read (REG) 224 and the execution units (EXE) 226. In one embodiment, the STALL signal 222 generated by scoreboard prediction unit (SPU) 244 may be forced to an inactive state by XPN Prefetch Window 242. FIG. 2 illustrates that an inverted stall signal 258 may be generated by inverter 252 and provided as an input to or gate 256. The output of or gate 256 is an enable signal 214 that may be sent to the REG 224 and EXE 226 stages of the instruction pipeline 200. In other embodiments, different subsequent instruction pipeline 200 stages, such as exception detection (DET) 228 and/or writeback (WRB) 230, may be connected to XPN Prefetch Window 242 or to enable signal 214. When enable signal 214 is active, it may inform REG 224 and EXE 226 that a normally software prefetch operation coming from MUX 232 should in this special case be henceforth treated as a hardware prefetch operation. Another way of viewing this situation is that during the time XPN Thread Switch 246 is active, normal software prefetch operations are prevented from being performed, so the XPN Prefetch Window 242, when active, enables hardware prefetches to be performed. One feature of the hardware prefetches is that, when performed, they do not update any registers. Another feature of the hardware prefetches is that, when performed, they do not raise any exceptions. The XPN Prefetch Window 242 may also act upon subsequent instruction pipeline 200 stages, when prefetch operations complementary to store and semaphore operations, to carry the "exclusive" hint. This exclusive hint allows such prefetch operations to be cached in the "E" state.

When hardware prefetches emerge from the instruction pipeline 200, in one embodiment along path 254, they may be added to the normal memory pipeline 270. In one embodiment memory pipeline 270 may be the L2 cache pipeline. The memory access operations (see, e.g., 272-298) in memory pipeline 270 may then be performed in order. Significantly, they may be performed regardless of whether the thread that initiated them originally is executing or not.

Figure 3:
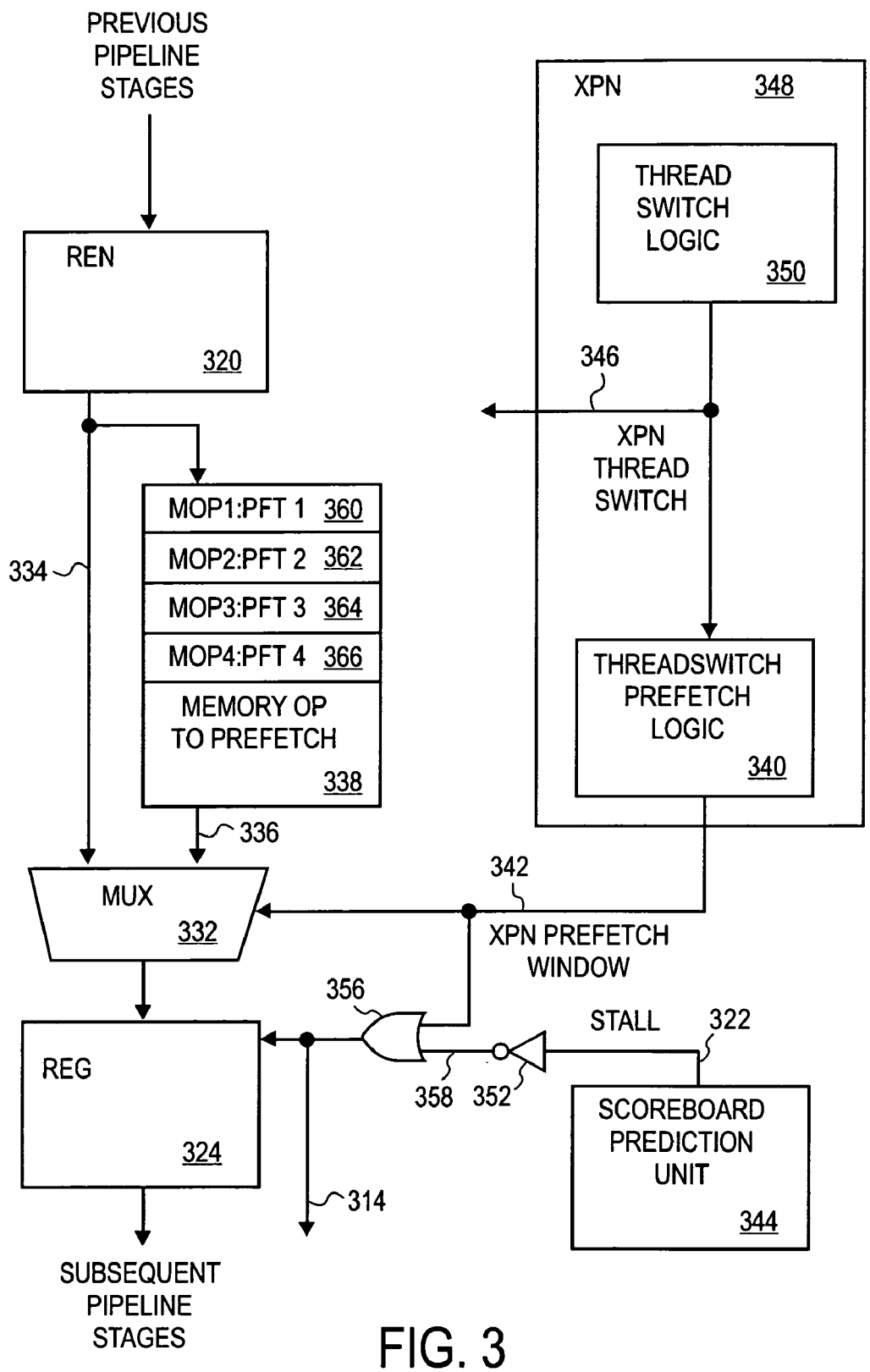
FIG. 3 is a detailed schematic diagram of circuits to convert memory access operations to prefetch operations, according to one embodiment of the present disclosure.

Referring now to FIG. 3, a detailed schematic diagram of circuits to convert memory access operations to prefetch operations is shown, according to one embodiment of the present disclosure. In one embodiment certain circuits (314, 320, 322, 324, 332, 334, 336, 340, 342, 344, 346, 348, 350, 352, 356, 358) shown in FIG. 3 may be equivalent to similar circuits (214, 220, 222, 224, 232, 234, 236, 240, 242, 244, 246, 248, 250, 252, 256, 258, respectively) shown in FIG. 2 above.

In one embodiment, the memory access operation (MOP) to prefetch converter 338 may include a lookup table. Entries in the lookup table may include [MOP 1: prefetch (PFT) 1] 360, [MOP 2: PFT 2] 362, [MOP 3: PFT 3] 364, and [MOP 4: PFT 4] 366. In each case when the decoded memory access operation is applied to the lookup table, the complementary prefetch operation emerges from the lookup table. Here a prefetch operation is "complementary" to a decoded memory access operation when they perform the same kind of memory access. As an example, lfetch (line prefetch) is complementary to ld (load), and lfetch.bias is complementary to ld.bias. In one embodiment, a table of some possible complementary memory access operations and prefetch operations may be given as in Table I below.

TABLE I

| MEMORY ACCESS OPERATION | COMPLEMENTARY PREFETCH OPERATION |
|---|---|
| ld/.s/.a/.sa/.c/.adq | lfetch |
| ld.bias | lfetch.bias |
| st | lfetch.bias |
| st.rel | lfetch.bias |
| st.spill | lfetch.bias |
| ldf | lfetch.ntl |
| stf | lfetch.bias.ntl |
| xchg | lfetch.bias.ntl |
| cmpxchg | lfetch.bias.ntl |
| fetchadd | lfetch.bias.ntl |

Here the operations may be those defined in the Intel® Itanium™ compatible processor architecture. Operations other than specified memory access operations may yield a null result from the lookup table. In other embodiments, circuits other than a look up table may be used to implement MOP to prefetch converter 338, and other types of load operations may be converted into other types of prefetch operations.

Figure 4:
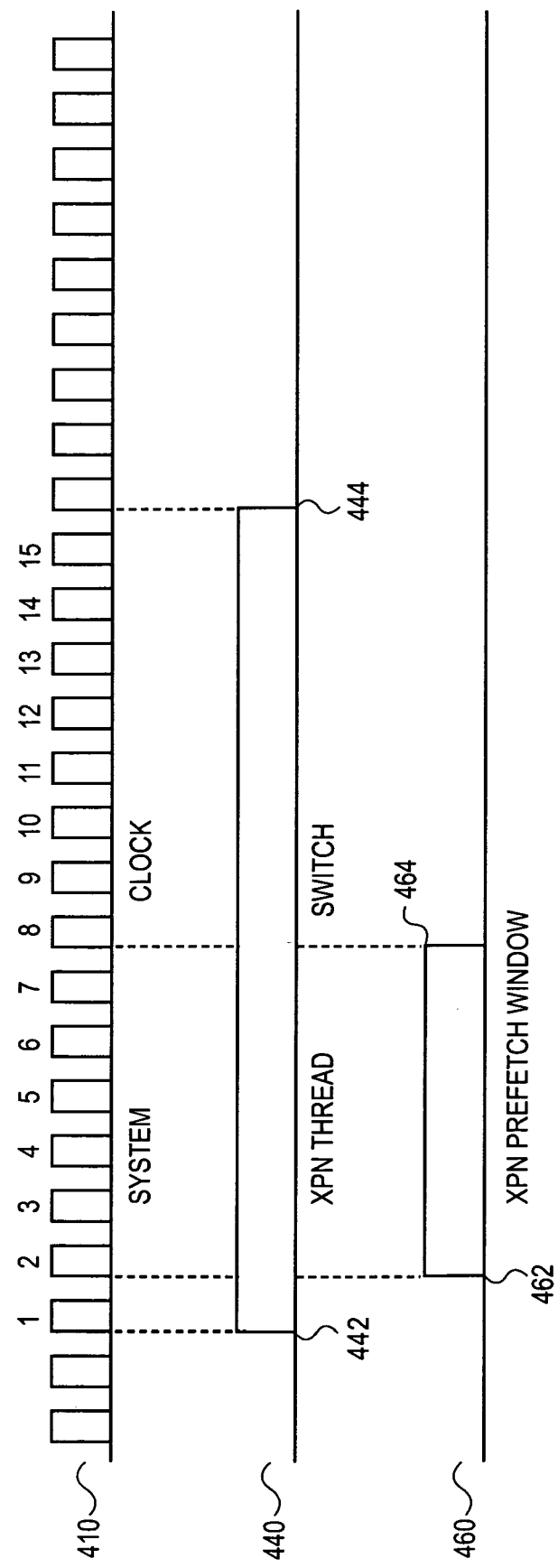
FIG. 4 is a timing diagram showing the relationship of a thread switch signal to a prefetch window signal, according to one embodiment of the present disclosure.

Referring now to FIG. 4, a timing diagram of the relationship of a thread switch signal to a prefetch window signal is shown, according to one embodiment of the present disclosure. In other embodiments, differing signal active periods may be used due to changes in instruction pipeline architecture and depth, and also to thread switching methodology. In one embodiment, a system clock 410 may be used to advance operations from one stage of the instruction pipeline to the next. When a thread switch is initiated, beginning at the clock pulse labeled 1, XPN Thread Switch 440 goes active at time 442, and stays active for 15 clock cycles. XPN Thread Switch 440 then goes inactive again at time 444. In other embodiments, the active period of XPN Thread Switch may be longer or shorter than 15 clock cycles.

The XPN Prefetch Window 460 may be constrained to become active only when XPN Thread Switch 440 is active. In the FIG. 4 embodiment, the XPN Prefetch Window 460 becomes active at time 462, one clock cycle after XPN Thread Switch 440 becomes active. In other embodiments this time may occur earlier or later. XPN Prefetch Window remains active for six clock cycles until time 464, corresponding to a pipeline length of six instructions or bundles of instructions loaded into the instruction buffers and the decode section of the pipeline. In other embodiments, the XPN Prefetch Window 460 may remain active for a different number of clock cycles depending upon the length of the pipeline and concerns of timing.

Referring now to FIG. 5, a diagram of the history of two threads executing is shown, according to one embodiment of the present disclosure. In the FIG. 5 embodiment, thread switching may be initiated by the occurrence of the earlier of two events: the current thread may have executed a fixed number of instructions or instruction bundles, for example 200, or the current thread may require the use of data that must be retrieved from system memory due to a cache miss. Also in the FIG. 5 embodiment, the conversion of memory access operations to prefetch operations during the thread switching period is disabled.

The first column in FIG. 5 shows the current thread executing, either thread zero (T0) or thread one (T1), or that a switch from one to the other is in progress. The second column in FIG. 5 shows what operation is pending at that time. The third column in FIG. 5 comments on the state at that point in time.

At time 510, a thread switch from T0 to T1 is imminent, and the OP given is the last operation to be performed in T0 prior to the thread switch. At times 512 and 514, the switch from T0 to T1 is performed, and instructions ld w and mov r1 r2, although in the instruction pipeline, will not be executed. Note that in this example ld w causes a cache miss, and that the mov r1 r2 attempts to use the data loaded by the ld w.

From time 516 through time 520, thread T1 executes normally for its allotted 200 instructions. Then at time 522 the switch from T1 back to T0 occurs. At time 524 the ld w instruction is executed, and, since it still is a cache miss, a memory access operation is pended. But at time 526 the mov r1 r2 instruction attempts to use the data requested by the ld w at time 524. Since this data is not in cache, the system performs an immediate thread switch from T0 to T1 at time 530.

From time 532 through time 540 thread T1 executes normally for its allotted 200 instructions. Then at time 542 another thread switch from T1 to T0 occurs. As the ld w at time 524 was not successfully completed earlier, another attempt at ld w at time 544 is made. By this times the memory access operation that was pended earlier may have completed, so the ld w at time 544 is a cache hit, and therefore the data required for the mov r1 r2 at time 546 is available.

In the FIG. 5 example, the mov r1 r2 instruction, originally in the instruction pipeline when a thread switch occurred, had to wait over 400 instruction cycles to successfully complete.

Referring now to FIG. 6, a diagram of the history of two threads executing is shown, according to another embodiment of the present disclosure. In the FIG. 6 embodiment, thread switching may again be initiated by the occurrence of the earlier of two events: the current thread may have executed a fixed number of instructions or instruction bundles, for example 200, or the current thread may require the use of data that must be retrieved from system memory due to a cache miss. However, in comparison with the FIG. 5 embodiment, in the FIG. 6 embodiment the conversion of memory access operations to prefetch operations during the thread switching period is enabled.

At time 610, a thread switch from T0 to T1 is imminent, and the OP given is the last operation to be performed in T0 prior to the thread switch. At times 612 and 614, the switch from T0 to T1 is performed, and instructions ld w and mov r1 r2, although in the instruction pipeline, will not be executed. Note that again in this example ld w would (if executed) cause a cache miss, and that the mov r1 r2 would (if executed) attempt to use the data loaded by the ld w.

However, in the FIG. 6 embodiment the ld w operation at time 612 is converted into a prefetch operation. This prefetch operation is pended to the memory pipeline.

From time 616 through time 620, thread T1 executes normally for its allotted 200 instructions. During this relatively long time period the prefetch operation pended at time 612 may be performed and completed. Then at time 622 the thread switch from T1 back to T0 occurs. At time 624 the ld w instruction is executed. But because the prefetch was performed, the ld w at time 624 is now a cache hit. Therefore at time 626 the mov r1 r2 instruction is able to use the data requested from cache by the ld w at time 624. Since this data is in cache, there is no reason for the system to perform an immediate thread switch from T0 to T1. Hence thread T0 continues executing normally from the operation at time 628 until the operation at time 640.

It may therefore be seen that the practice of generating prefetch operations from memory access operations left in the instruction pipeline during a thread switch may cause the completion of operations much sooner than would otherwise be the case.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

What is claimed is:

1. An apparatus, comprising:
 a decoder to supply a decoded memory access operation from a memory access instruction;
 a converter coupled to said decoder to convert said decoded memory access operation to a prefetch operation;
 a multiplexor to receive said decoded memory access operation and said prefetch operation; and
 an execution unit to receive a multiplexor output from said multiplexor.

2. The apparatus of claim 1, wherein said prefetch operation is switched to said multiplexor output responsively to a prefetch window signal.

3. The apparatus of claim 2, wherein said prefetch window signal is active when a thread switch signal is active.

4. The apparatus of claim 3, further comprising a thread switch logic to supply said thread switch signal.

5. The apparatus of claim 3, wherein said decoded memory access operation is supplied when said prefetch window signal is inactive.

6. The apparatus of claim 3, wherein said memory access instruction is in a first thread, wherein control is switched to a second tread responsive to said thread switch signal.

7. The apparatus of claim 1, wherein said prefetch operation is complementary to said memory access instruction.

8. The apparatus of claim 1, wherein said prefetch operation is a hardware prefetch operation.

9. The apparatus of claim 8, wherein said prefetch operation is entered into a memory pipeline.

10. The apparatus of claim 9, wherein said prefetch operation does not update registers.

11. The apparatus of claim 9, wherein said prefetch operation does not generate exceptions.

12. The apparatus of claim 1, wherein said converter includes a lookup table.

13. The apparatus of claim 12, wherein said lookup table includes a complementary prefetch operation to a listed decoded memory access operation.

14. A method, comprising:
 converting a decoded memory access operation of a first thread into a prefetch operation;
 loading said prefetch operation into a memory pipeline when a prefetch window signal is active; and
 performing said prefetch operation in said memory pipeline during execution of a second thread.

15. The method of claim 14, further comprising activating said prefetch window signal when a thread switch signal is active.

16. The method of claim 14, wherein said converting includes looking up said prefetch operation in a lookup table.

17. The method of claim 14, wherein said loading includes switching said prefetch operation to an execution unit responsive to said prefetch window signal.

18. The method of claim 14, wherein said converting includes convening a software decoded memory access operation into a hardware prefetch operation.

19. The method of claim 18, wherein said performing includes preventing the updating of registers.

20. The method of claim 18, wherein said performing includes preventing the generation of exceptions.

21. An apparatus, comprising:
 means for convening a decoded memory access operation of a first thread into a prefetch operation;
 means for loading said prefetch operation into a memory pipeline when a prefetch window signal is active; and
 means for performing said prefetch operation in said memory pipeline during execution of a second thread.

22. The apparatus of claim 21, further comprising means for activating said prefetch window signal when a thread switch signal is active.

23. The apparatus of claim 21, wherein said means for convening includes means for looking up said prefetch operation.

24. The apparatus of claim 21, wherein said means for loading includes means for switching said prefetch operation to an execution unit responsive to said prefetch window signal.

25. The apparatus of claim 21, wherein said means for converting includes means for converting a software decoded memory access operation into a hardware prefetch operation.

26. The apparatus of claim 25, wherein said means for performing includes means for preventing the updating of registers.

27. The method of claim 25, wherein said means for performing includes means for preventing the generation of exceptions.

28. A system, comprising:
 a decoder to supply a decoded memory access operation from a memory access instruction;
 a converter coupled to said decoder to convert said decoded memory access operation to a prefetch operation;
 a multiplexor to receive said decoded memory access operation and said prefetch operation;
 an execution unit to receive a multiplexor output from said multiplexor; and
 a memory to return prefetched data responsive to said prefetch operation.

29. The system of claim 28, wherein said prefetch operation is presented to said memory via a memory pipeline.

30. The system of claim 29, wherein said memory pipeline is a level two cache pipeline.

31. The system of claim 28, wherein said memory returns said prefetched data via a system bus.

32. The system of claim 28, wherein said prefetch operation is a hardware prefetch operation.

33. An apparatus comprising:
- a decoder to supply a decoded memory access operation from a memory access instruction;
- a converter coupled to said decoder to convert said decoded memory access operation to a prefetch operation;
- an execution unit to receive said prefetch operation when a thread switch signal is active; and
- wherein said execution unit is to receive said prefetch operation when a prefetch window signal is active.

34. The apparatus of claim 33, wherein said converter includes a lookup table.

35. The apparatus of claim 34, wherein said lookup table includes a complementary prefetch operation to said decoded memory access operation.

36. The apparatus of claim 33, wherein said prefetch window signal switches said prefetch operation to said execution unit.

37. The apparatus of claim 36, wherein said prefetch window signal is coupled to said execution unit to indicate that said prefetch operation is to be executed as a hardware prefetch operation.

38. The apparatus of claim 37, wherein said decoded memory access operation is from a first thread, and said prefetch operation is executed during execution of a second thread.

* * * * *

UNITED STATES PATENT AND TRADEMARK OFFICE
CERTIFICATE OF CORRECTION

PATENT NO. : 7,447,877 B2  Page 1 of 1
APPLICATION NO. : 10/172180
DATED : November 4, 2008
INVENTOR(S) : Bharadwaj Pudipeddi and Udo Walterscheidt It is certified that error appears in the above-identified patent and that said Letters Patent is hereby corrected as shown below:

Column 7:
Line 52, "tread" should be --thread--;

Column 8:
Line 17, "convening" should be --converting--;
Line 24, "convening" should be --converting--;
Line 34, "convening" should be --converting--.

Signed and Sealed this

Thirtieth Day of December, 2008

JON W. DUDAS
*Director of the United States Patent and Trademark Office*